(12) United States Patent
Karam

(10) Patent No.: US 7,917,866 B1
(45) Date of Patent: *Mar. 29, 2011

(54) METHOD, SYSTEM, AND GRAPHICAL USER INTERFACE FOR MEETING-SPOT-RELATED ONLINE COMMUNICATIONS

(75) Inventor: Joseph F. Karam, Mountain View, CA (US)

(73) Assignee: Google Inc., Mountain View, CA (US)

( * ) Notice: Subject to any disclaimer, the term of this patent is extended or adjusted under 35 U.S.C. 154(b) by 413 days.

This patent is subject to a terminal disclaimer.

(21) Appl. No.: 11/323,142

(22) Filed: Dec. 30, 2005

(51) Int. Cl.
*G06F 3/048* (2006.01)
*G06F 12/02* (2006.01)
*G01C 21/30* (2006.01)
*H04W 74/00* (2009.01)

(52) U.S. Cl. ........ 715/810; 715/764; 715/753; 715/751; 701/208; 345/758; 455/567

(58) Field of Classification Search .................. 715/764, 715/810, 751, 753; 701/208; 707/100; 345/758; 455/567
See application file for complete search history.

(56) References Cited

U.S. PATENT DOCUMENTS

| | | | | |
|---|---|---|---|---|
| 5,818,450 A | 10/1998 | Katsuta | ........................ | 345/352 |
| 5,883,626 A | 3/1999 | Glaser et al. | .................. | 345/342 |
| 6,202,212 B1 | 3/2001 | Sturgeon et al. | | |
| 6,366,962 B1* | 4/2002 | Teibel | .......................... | 709/245 |
| 6,424,910 B1* | 7/2002 | Ohler et al. | .................... | 701/202 |
| 6,577,714 B1 | 6/2003 | Darcie et al. | ............... | 379/93.17 |
| 6,677,968 B1* | 1/2004 | Appelman | .................... | 715/853 |
| 6,681,108 B1* | 1/2004 | Terry et al. | .................. | 455/412.2 |
| 6,690,918 B2 | 2/2004 | Evans et al. | | |
| 6,714,791 B2 | 3/2004 | Friedman | ................... | 455/456.1 |
| 6,732,120 B1 | 5/2004 | Du | ............................ | 707/104.1 |
| 6,745,178 B1 | 6/2004 | Emens et al. | | |
| 6,771,970 B1* | 8/2004 | Dan | .......................... | 455/456.1 |
| 6,829,532 B2 | 12/2004 | Obradovich et al. | | |
| 6,968,179 B1 | 11/2005 | De Vries | | |
| 6,981,021 B2* | 12/2005 | Takakura et al. | ............. | 709/204 |
| 7,069,308 B2* | 6/2006 | Abrams | ........................ | 709/218 |
| 7,082,365 B2* | 7/2006 | Sheha et al. | .................. | 701/209 |

(Continued)

FOREIGN PATENT DOCUMENTS

WO    WO 02/01405    1/2002

(Continued)

OTHER PUBLICATIONS

Alex Barnet, Wayback Machine (Archive.Org) Alex Barnet Blog website, Oct. 26, 2005, pp. 1-5.*

(Continued)

*Primary Examiner* — Simon Ke
*Assistant Examiner* — Erik V Stitt
(74) *Attorney, Agent, or Firm* — Morgan, Lewis & Bockius LLP

(57) ABSTRACT

A method, system, and graphical user interface for meeting-spot-related online communications are disclosed. A "meeting spot" is a specific physical location where two or more people can arrange to meet face to face. One aspect of the invention involves a computer-implemented method in which a server computer receives meeting spot data that correspond to a plurality of meeting spots selected by a computer user at a client device and sends information concerning other computer users that have also selected two or more of the meeting spots selected by the computer user to the client device for display.

6 Claims, 12 Drawing Sheets

U.S. PATENT DOCUMENTS

| | | | |
|---|---|---|---|
| 7,117,254 B2* | 10/2006 | Lunt et al. | 709/218 |
| 7,136,915 B2* | 11/2006 | Rieger, III | 709/223 |
| 7,188,153 B2 | 3/2007 | Lunt et al. | |
| 7,200,638 B2 | 4/2007 | Lake | 709/206 |
| 7,202,814 B2 | 4/2007 | Caspi et al. | 342/357.07 |
| 7,222,187 B2* | 5/2007 | Yeager et al. | 709/237 |
| 7,234,117 B2 | 6/2007 | Zaner et al. | 715/758 |
| 7,236,799 B2 | 6/2007 | Wilson et al. | 455/456.3 |
| 7,243,075 B1 | 7/2007 | Shaffer et al. | 705/10 |
| 7,310,676 B2 | 12/2007 | Bourne | 709/227 |
| 7,340,057 B2 | 3/2008 | Martin, Jr. et al. | 380/247 |
| 7,342,587 B2 | 3/2008 | Danzig et al. | |
| 7,373,244 B2 | 5/2008 | Kreft | 701/207 |
| 7,468,729 B1 | 12/2008 | Levinson | |
| 7,472,352 B2* | 12/2008 | Liversidge et al. | 715/758 |
| 7,568,007 B2 | 7/2009 | Narayanaswami et al. | 709/206 |
| 7,603,413 B1 | 10/2009 | Herold et al. | 709/204 |
| 7,606,580 B2 | 10/2009 | Granito et al. | 455/456 |
| 2002/0007396 A1 | 1/2002 | Takakura et al. | |
| 2002/0013738 A1 | 1/2002 | Vistisen | |
| 2002/0055926 A1* | 5/2002 | Dan et al. | 707/100 |
| 2002/0103892 A1 | 8/2002 | Rieger, III | 709/223 |
| 2002/0116458 A1 | 8/2002 | Bricklin et al. | |
| 2002/0130904 A1 | 9/2002 | Becker et al. | |
| 2003/0037110 A1* | 2/2003 | Yamamoto | 709/204 |
| 2003/0055983 A1* | 3/2003 | Callegari | 709/227 |
| 2003/0078981 A1 | 4/2003 | Harms et al. | 709/206 |
| 2003/0079024 A1 | 4/2003 | Hough et al. | 709/227 |
| 2003/0135493 A1 | 7/2003 | Phelan et al. | |
| 2003/0154250 A1* | 8/2003 | Miyashita | 709/204 |
| 2003/0210265 A1 | 11/2003 | Haimberg | 345/758 |
| 2003/0222902 A1 | 12/2003 | Chupin et al. | 345/738 |
| 2004/0041836 A1* | 3/2004 | Zaner et al. | 345/751 |
| 2004/0054572 A1* | 3/2004 | Oldale et al. | 705/10 |
| 2004/0122810 A1 | 6/2004 | Mayer | 707/3 |
| 2004/0148351 A1 | 7/2004 | Cotte | 709/205 |
| 2004/0152477 A1 | 8/2004 | Wu et al. | 455/466 |
| 2004/0162830 A1 | 8/2004 | Shirwadkar et al. | |
| 2004/0172455 A1 | 9/2004 | Green et al. | 709/207 |
| 2004/0179039 A1 | 9/2004 | Blattner et al. | 345/758 |
| 2004/0189701 A1 | 9/2004 | Badt, Jr. | |
| 2004/0203746 A1 | 10/2004 | Knauerhase et al. | 455/432.1 |
| 2004/0210844 A1 | 10/2004 | Pettinati et al. | 715/708 |
| 2005/0065995 A1 | 3/2005 | Milstein et al. | 709/202 |
| 2005/0086211 A1 | 4/2005 | Mayer | |
| 2005/0130634 A1 | 6/2005 | Godfrey | |
| 2005/0154639 A1 | 7/2005 | Zetmeir | |
| 2005/0165715 A1 | 7/2005 | Farnham et al. | |
| 2005/0172001 A1 | 8/2005 | Zaner et al. | |
| 2005/0174975 A1 | 8/2005 | Mgrdechian et al. | |
| 2005/0177385 A1 | 8/2005 | Hull et al. | |
| 2005/0193054 A1 | 9/2005 | Wilson et al. | |
| 2005/0197846 A1 | 9/2005 | Pezaris et al. | |
| 2005/0198031 A1 | 9/2005 | Pezaris et al. | |
| 2005/0210102 A1 | 9/2005 | Johnson et al. | |
| 2005/0210409 A1 | 9/2005 | Jou | |
| 2005/0228853 A1 | 10/2005 | Yamamura et al. | 709/200 |
| 2005/0246866 A1* | 11/2005 | Dalsing et al. | 16/412 |
| 2005/0246886 A1 | 11/2005 | Morel | |
| 2005/0250552 A1* | 11/2005 | Eagle et al. | 455/567 |
| 2005/0256866 A1 | 11/2005 | Lu et al. | |
| 2005/0283308 A1 | 12/2005 | Szabo et al. | 701/207 |
| 2006/0031772 A1 | 2/2006 | Valeski | |
| 2006/0085259 A1 | 4/2006 | Nicholas et al. | 705/14 |
| 2006/0184886 A1 | 8/2006 | Chung et al. | 715/758 |
| 2006/0190536 A1 | 8/2006 | Strong et al. | |
| 2006/0235873 A1 | 10/2006 | Thomas | |
| 2006/0241859 A1 | 10/2006 | Kimchi et al. | 701/208 |
| 2006/0294134 A1* | 12/2006 | Berkhim et al. | 707/102 |
| 2007/0067098 A1 | 3/2007 | Zelentsov | 701/208 |
| 2007/0112735 A1* | 5/2007 | Holloway et al. | 707/3 |
| 2007/0118809 A1 | 5/2007 | Ozugur et al. | 715/776 |
| 2007/0162862 A1 | 7/2007 | Ogasawara et al. | 715/751 |

FOREIGN PATENT DOCUMENTS

| | | |
|---|---|---|
| WO | WO 2005/006145 | 1/2005 |
| WO | WO 2005/074443 | 8/2005 |
| WO | WO 2005/077068 | 8/2005 |

OTHER PUBLICATIONS

"Talk and IM with your friends for free", *Google Talk*, www.google.com/talk.

Apple.com, "iChat AV Videoconferencing for the rest of us", www.apple.com/macosx/features/ichat.

WaveMarket.com, Company and Product Overview, www.wavemarket.com.

Smith, Brad, "Spreading the Word with Moblogs" Jun. 15, 2005, *Wireless Week,* www.wirelessweek.com/article/CA608001.html?text=spreading+the+word+with+...

Balkin, Adam, "New Cell Phone Services Can Help Manage Your Social Life", Apr. 6, 2005, published Sep. 26, 2005 by *NY1 News*.

GeoCommunity Staff, "Affiliate and Reseller Programs for GIS, Geo-Spatial and Location-Based Content Websites", *GeoCommunity.com,* (no date).

"WaveMarket's Crunkie Puts Mobile Social Networks on the Map", Nov. 15, 2004, www.prnewswire.com/cgi-bin/stories.pl?ACCT=104&story=/www/story/11-15 ...

Campbell, Susan, et al., "Blogscape: Cartography on Social Networks", (no date).

WaveBlog product information, *Demo,* 2004, www.demo.com/demonstrators/demo2004/54868.html.

dodgeball.com, Company Information, (no date), www.dodgeball.com.

Johnson, Steven, "Friends 2005: Hooking Up", *Discover,* vol. 26, No. 9, Sep. 2005, pp. 22-23.

"Mates, when social networks marry presence", *Om Malik's Broadband Blog,* posted May 4, 2005, http://gigaom.com/2005/05/04/mates-when-social-networks-marry-presence/.

Schoder, Detlef Prof. Dr., "Targeting mobile Consumers (I): context-independent mobile B2C-Applications", Lecture Unit 5, WHU, EEB FS 2003.

"Entering the UMTS era—mobile applications for pocket devices and services", Part Two, European Information Technology Observatory, EITO 2002, pp. 203-219.

Bleecker, Julian, Prof., "Location-based mobile media: maps, games & stories", Interactive Media Division, School of Cinema-TV, University of Southern California, Fall 2005.

"Mobile Marketing and Wireless Internet Advertising", Position Paper, InterACT Research Communications Company, Nov. 1999.

Risnes, Oddvar, "Developing Advanced Parlay-Enabled Value Added Services", Telenor Forksningsnotat/Scientofic Document R&D N 76/2003, Jan. 7, 2004.

"Application for today's mobile lifestyle", Community Messaging Center (CMC) 5.0, HP OpenCall—Yomi, Hewlett-Packard Development Company, 5982-2057EE, Oct. 2003.

Burak, Assaf, et al., "Analyzing Usage of Location based Services", CHI 2003, Apr. 5-10, 2003, Ft. Lauderdale, FL. ACM 1-58113-630-7/03/0004.

Burak, Assaf, et al. "Usage Patterns of FriendZone—Mobile Location-Based Community Services", http://www.this.net/-frank/pstill,hatml.

Vogiazou, Yanna et al., "Presence Based Play: Towards a Design for Large Group Social Interaction", Proceedings of the First International Conference on Appliance Design) (1AD), May 6-8, 2003, Bristol, UK.

Laycock, Jennifer, "Amazon's A9 Offers Unique Local Search Experience", Mar. 17, 2005, www.searchengineguide.com/laycock/003701.html.

Piesick, John, "Click to Call: Creating Sales and Customer Satisfaction", ArriveNet Business Editorials, http://editorials.arrivenet.com/business/print.php?url-htp://64.233.16 ...

Amazon.com Yellow Page (sample page), www.amazon.com/gp/yp/B0004KKOPC/103-4107609-18318...

Office Action mailed Jul. 8, 2008 in U.S. Appl. No. 11/522,548.

Office Action mailed Jul. 11, 2008 in U.S. Appl. No. 11/759,848.

Office Action mailed Sep. 24, 2008 in U.S. Appl. No. 11/323,115.

Office Action mailed Aug. 21, 2008 in U.S. Appl. No. 11/323,090.
Office Action mailed Oct. 1, 2008 in U.S. Appl. No. 11/323,090.
Saint-Andre, Ed. P., "Extensible Messaging and Presence Protocol (XMPP): Instant Messaging and Presence", 90 pages, Oct. 2004.
CNET Review of Google Maps, web address: http://reviews.cnet.com/online-software-services/google-maps/4505-9239_7-31591128.html, published, 6 pages, Nov. 7, 2005.
Office Action mailed Jan. 7, 2008 for related U.S. Appl. No. 11/323,090.
Office Action mailed Jun. 10, 2008 for related U.S. Appl. No. 11/323,090.
Office Action mailed Apr. 2, 2008 for related U.S. Appl. No. 11/323,115.
Office Action mailed Apr. 2, 2008 in U.S. Appl. No. 11/323,115.
Office Action mailed Jan. 7, 2008 in U.S. Appl. No. 11/323,090.
Office Action mailed Jun. 10, 2008 in U.S. Appl. No. 11/323,090.
Office Action dated Apr. 1, 2008 in U.S. Appl. No. 11/323,090.
Office Action dated Apr. 14, 2009 in U.S. Appl. No. 11/323,090.
Office Action dated Jun. 24, 2009 in U.S. Appl. No. 11/323,090.
Office Action dated Jun. 29, 2009 in U.S. Appl. No. 11/323,090.
Office Action dated Apr. 1, 2009 in U.S. Appl. No. 11/323,115.
Office Action dated Aug. 28, 2009 in U.S. Appl. No. 11/323,115.
Office Action dated Oct. 1, 2008 in U.S. Appl. No. 11/759,848.
Office Action dated Dec. 29, 2008 in U.S. Appl. No. 11/759,848.
Office Action dated Mar. 3, 2009 in U.S. Appl. No. 11/759,848.
Office Action dated Mar. 13, 2009 in U.S. Appl. No. 11/759,848.
Office Action dated Mar. 16, 2009 in U.S. Appl. No. 11/759,848.
Office Action dated Jun. 10, 2009 in U.S. Appl. No. 11/759,848.
Office Action dated Aug. 24, 2009 in U.S. Appl. No. 11/759,848.
Office Action/Interview Summary dated Oct. 1, 2008 in U.S. Appl. No. 11/522,548.
Office Action dated Dec. 22, 2008 in U.S. Appl. No. 11/522,548.
Office Action dated Mar. 3, 2009 in U.S. Appl. No. 11/522,548.
Office Action dated Mar. 13, 2009 in U.S. Appl. No. 11/522,548.
Office Action dated Jun. 25, 2009 in U.S. Appl. No. 11/522,548.
LocationNet.com My Maps, LocationNet.com, Aug. 5, 2005.
LocationNet.com, Products Demo, LocationNet.Com, Aug. 5, 2005.
http://digg.com/sotfware/New Page Specific Chat Extension Launched for Firefox (Safari and IE soon) 2007, 3 pages.
http://www.chatsum.com, Nov. 16, 2007, 4 pages.
http://www.chatsum.com/about, Nov. 16, 2007, 2 pages.
Office Action for U.S. Appl. No. 11/323,090 dated Sep. 21, 2009.
Office Action for U.S. Appl. No. 11/759,848 dated Jan. 22, 2010.
Notice of Allowance for U.S. Appl. No. 11/522,548 dated Mar. 8, 2010.
Office Action for U.S. Appl. No. 11/323,115 dated Mar. 11, 2010.
Office Action for U.S. Appl. No. 11/323,090 dated Apr. 5, 2010.

* cited by examiner

METHOD, SYSTEM, AND GRAPHICAL USER INTERFACE FOR MEETING-SPOT-RELATED ONLINE COMMUNICATIONS

RELATED APPLICATIONS

This application is related to U.S. patent application Ser. No. 11/323,090, filed Dec. 30, 2005, entitled "Method, System, and Graphical User Interface for Meeting-Spot Maps for Online Communications," which application is incorporated by reference herein in its entirety.

This application is related to U.S. patent application Ser. No. 11/323,115, filed Dec. 30, 2005, entitled "Method, System, and Graphical User Interface for Identifying and Communicating with Meeting Spots," which application is incorporated by reference herein in its entirety.

TECHNICAL FIELD

The disclosed embodiments relate generally to online communications. More particularly, the disclosed embodiments relate to methods, systems, and graphical user interfaces for meeting-spot-related online communications.

BACKGROUND

People increasingly use online communications to interact with their friends and to meet new people. As used herein, "online communications" means real-time online communications technologies, including character-based technologies (e.g., text-based instant messaging, but not e-mail), audio technologies (e.g., audio chat and Voice over Internet Protocol (VoIP) telephony), and video technologies (e.g., video chat).

Numerous techniques have been developed that use online communications to improve our social lives, including social networking and online dating services. These techniques typically require a user to fill out a personal profile, which can be cumbersome and also raises privacy concerns. Thus, it would be highly desirable to find new, less cumbersome, more intuitive, and more secure ways to use online communications to interact with friends and to meet new people.

SUMMARY

The present invention overcomes the limitations and disadvantages described above by providing methods, systems, and graphical user interfaces (GUIs) for meeting-spot-related online communications. As used herein, a "meeting spot" is a specific physical location where two or more people could arrange to meet face to face. Exemplary meeting spots include, without limitation, a restaurant, bar, club, library, gym, bookstore, park, or store. Note that a meeting spot is limited in size so that two people can find (or can reasonably be expected to find) each other at the spot. For example, Manhattan is too large to be a meeting spot, but the Four Seasons restaurant at 99 E. 52nd St. in Manhattan could be a meeting spot.

One aspect of the invention involves a computer-implemented method in which a server computer receives meeting spot data that correspond to a plurality of meeting spots selected by a computer user at a client device and sends information concerning other computer users that have also selected two or more of the meeting spots selected by the computer user to the client device for display.

Another aspect of the invention involves a computer-implemented method in which a client device sends meeting spot data that correspond to a plurality of meeting spots selected by a computer user to a server computer and receives information concerning other computer users that have also selected two or more of the meeting spots selected by the computer user from the server computer for display.

Another aspect of the invention involves a graphical user interface on a computer that includes a plurality of icons representing meeting spots selected by a computer user overlaid on a graphically displayed map and a plurality of icons representing other computer users that have also selected two or more of the meeting spots selected by the computer user.

Another aspect of the invention involves a system that includes at least one server. The at least one server is configured to receive meeting spot data that correspond to a plurality of meeting spots selected by a computer user at a client device and send information concerning other computer users that have also selected two or more of the meeting spots selected by the computer user to the client device for display.

Another aspect of the invention involves a client device that is configured to send meeting spot data that correspond to a plurality of meeting spots selected by a computer user to a server computer and receive information concerning other computer users that have also selected two or more of the meeting spots selected by the computer user from the server computer for display.

Another aspect of the invention involves a computer-program product that includes a computer readable storage medium and a computer program mechanism embedded in the computer readable storage medium. The computer program mechanism includes instructions, which when executed by a server computer, cause the server computer to receive meeting spot data that correspond to a plurality of meeting spots selected by a computer user at a client device and send information concerning other computer users that have also selected two or more of the meeting spots selected by the computer user to the client device for display.

Another aspect of the invention involves a computer-program product that includes a computer readable storage medium and a computer program mechanism embedded in the computer readable storage medium. The computer program mechanism includes instructions, which when executed by a client device, cause the client device to send meeting spot data that correspond to a plurality of meeting spots selected by a computer user to a server computer and receive information concerning other computer users that have also selected two or more of the meeting spots selected by the computer user from the server computer for display.

Another aspect of the invention involves a server computer that includes means for receiving meeting spot data that correspond to a plurality of meeting spots selected by a computer user at a client device and means for sending information concerning other computer users that have also selected two or more of the meeting spots selected by the computer user to the client device for display.

Another aspect of the invention involves a client device that includes means for sending meeting spot data that correspond to a plurality of meeting spots selected by a computer user to a server computer and means for receiving information concerning other computer users that have also selected two or more of the meeting spots selected by the computer user from the server computer for display.

Thus, meeting-spot-related online communications provide more intuitive, less invasive methods, systems, and GUIs to interact with friends and to meet new people.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DESCRIPTION OF EMBODIMENTS

Methods, systems, and graphical user interfaces for meeting-spot-related online communications are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

Figure 1:
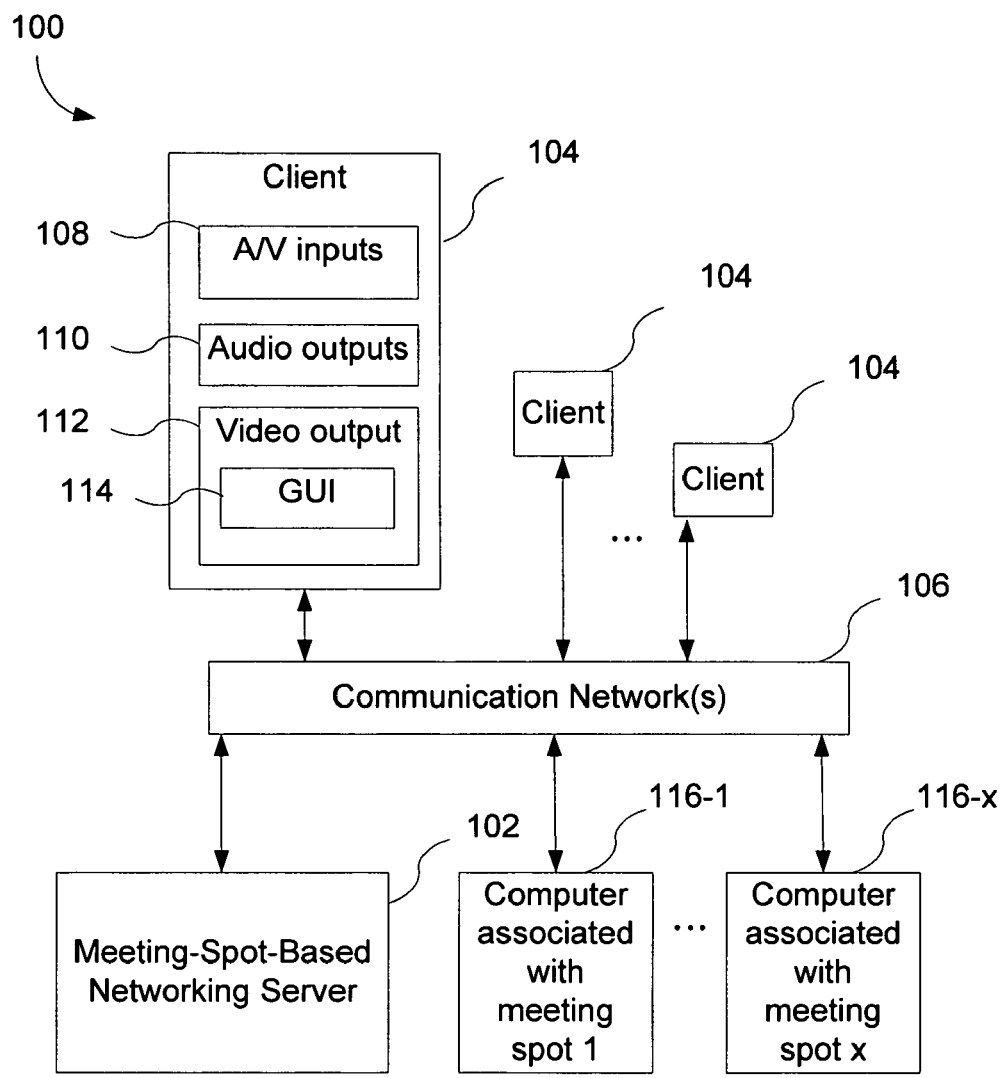
FIG. 1 is a block diagram illustrating an exemplary distributed computer system in accordance with one embodiment of the invention.

FIG. 1 is a block diagram illustrating an exemplary distributed computer system 100 according to one embodiment of the invention. FIG. 1 shows various functional components that will be referred to in the detailed discussion that follows. This system includes client devices 104, meeting-spot-based networking server 102, a computer associated with a meeting spot 116, and communication network(s) 106 for interconnecting these components.

Client 104 can be any of a number of devices (e.g., an internet kiosk, personal digital assistant, cell phone, gaming device, desktop computer, or laptop computer) used to enable the activities described below. Client 104 typically includes audio and/or video inputs 108 (e.g., a microphone and a video camera), audio output 110 (e.g., speakers or headphones), and video output 112 (e.g., a display). Video output 112 displays a graphical user interface (GUI) 114.

The computer 116 associated with the meeting spot may be a computer used to make reservations for the meeting spot or to provide other services associated with the meeting spot. Computer 116 may optionally be used to host chat rooms or other multi-user communications. The computer 116 associated with the meeting spot may be located at the meeting spot, or anywhere else (e.g., at the facility of a computer services provider that provides services for the meeting spot).

Figure 2:
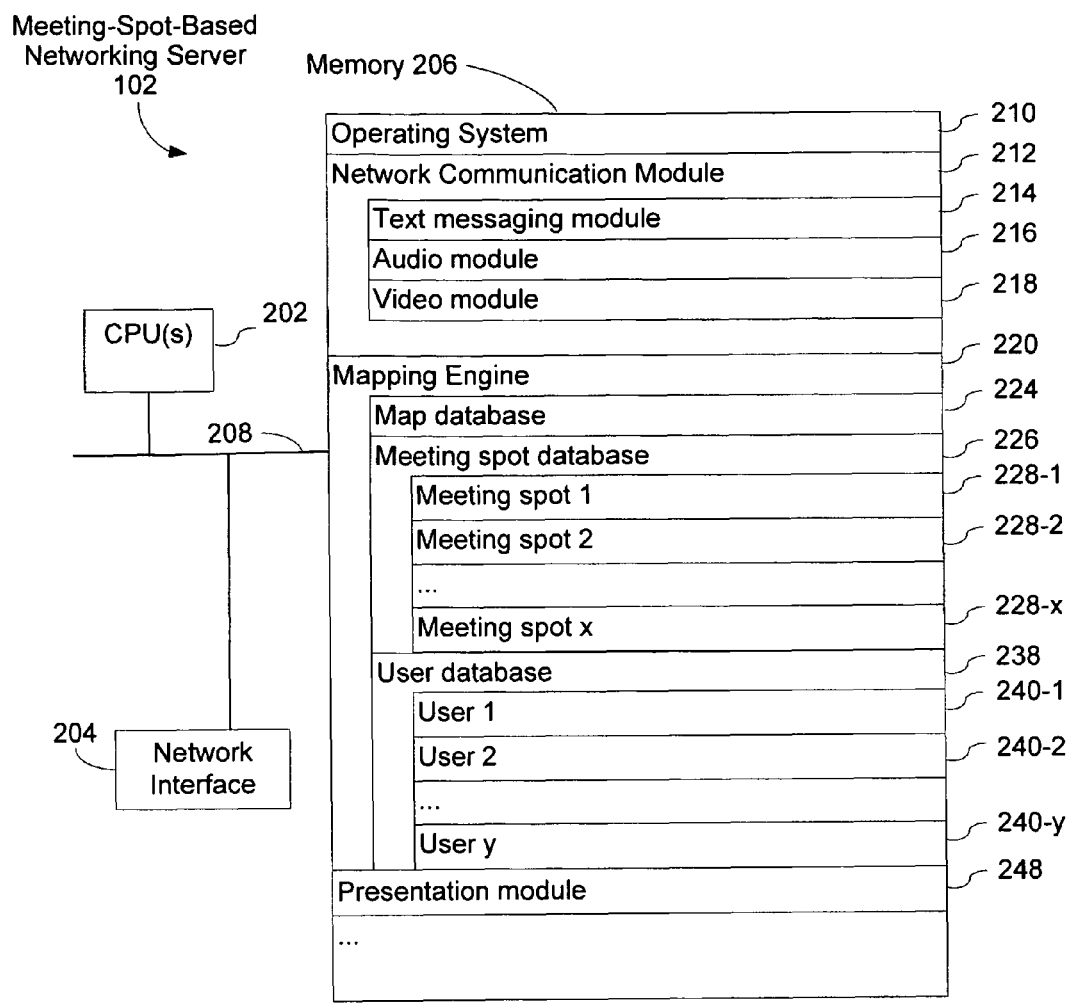
FIG. 2 is a block diagram illustrating a meeting-spot-based networking server in accordance with one embodiment of the present invention.

FIG. 2 is a block diagram illustrating meeting-spot-based networking server 102 in accordance with one embodiment of the present invention. Server 102 typically includes one or more processing units (CPUs) 202, one or more network or other communications interfaces 204, memory 206, and one or more communication buses 208 for interconnecting these components. Server 102 may optionally include a graphical user interface (not shown), which typically includes a display device, a keyboard, and a mouse or other pointing device. Memory 206 may include high-speed random access memory and may also include non-volatile memory, such as one or more magnetic or optical storage disks. Memory 206 may optionally include mass storage that is remotely located from CPUs 202. Memory 206 may store the following programs, modules and data structures, or a subset or superset thereof:
- Operating System 210 that includes procedures for handling various basic system services and for performing hardware dependent tasks;
- Network Communication Module (or instructions) 212 that is used for connecting server 102 to other computers (e.g., clients 104) via the one or more communications Network Interfaces 204 (wired or wireless) and one or more communications networks 106 (FIG. 1), such as the Internet, other wide area networks, local area networks, metropolitan area networks, and so on;
- Mapping Engine 220 that receives meeting-spot-related requests from and provides responses to clients 104; and
- Presentation module 248 that formats the results from mapping engine 220 for display.

Network Communication Module 212 may include the following programs, modules and data structures, or a subset or superset thereof:
- Text messaging module 214 that coordinates text messaging (e.g., instant messaging) between clients 104;
- Audio module 216 that coordinates audio communications (e.g., voice chat or VoIP) between clients 104; and
- Video module 218 that coordinates video communications (e.g., video chat) between clients 104.

In some embodiments, the text messaging, audio or voice communications, and/or video communications between clients 104 are performed in a manner that does not require the use of server 102, such as via peer-to-peer networking.

Mapping Engine 220 may include the following programs, modules and data structures, or a subset or superset thereof:
- Map database 224 that stores mapping data;
- Meeting spot database 226 that stores records 228 for meeting spots (e.g., records 228-1, 228-2 and 228-x for meeting spots 1, 2 and x, respectively); and User database 238 that stores records 240 for users (e.g., records 240-1, 240-2, 240-7 for Users 1, 2 and y, respectively)

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIG. 2 shows server 102 as a number of discrete items, FIG. 2 is intended more as a functional description of the various features which may be present in server 102 rather than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers in server 102 and how features are allocated among them will vary from one implementation to another, and may depend in part on the amount of data traffic that the system must handle during peak usage periods as well as during average usage periods.

Figure 3A:
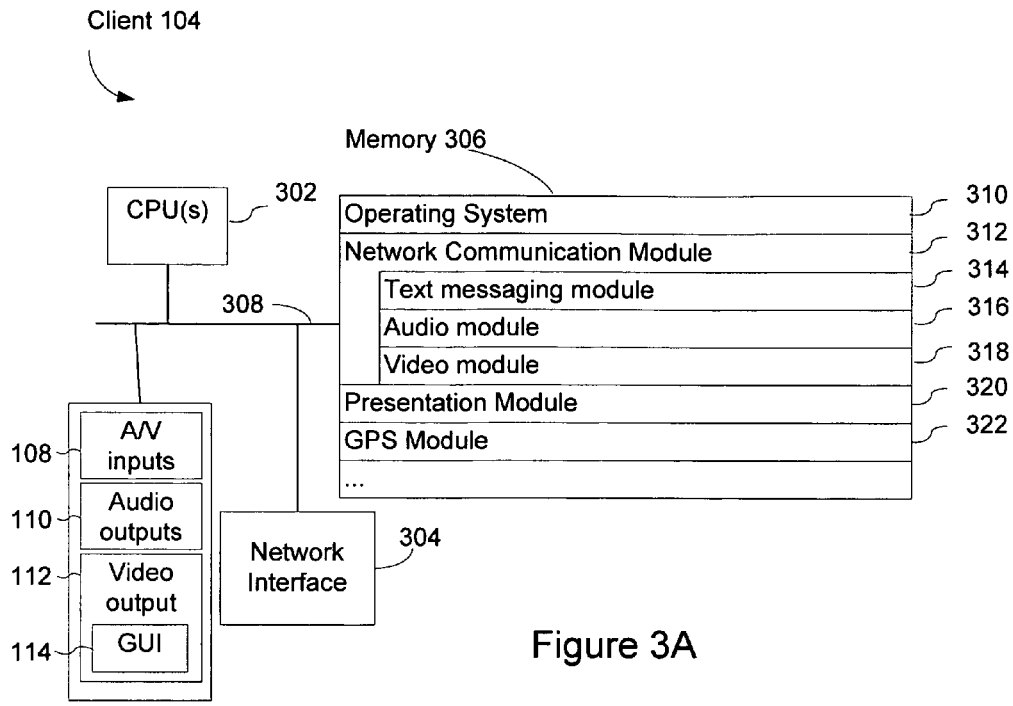
FIGS. 3A and 3B are block diagrams illustrating two exemplary clients.
Figure 3B:
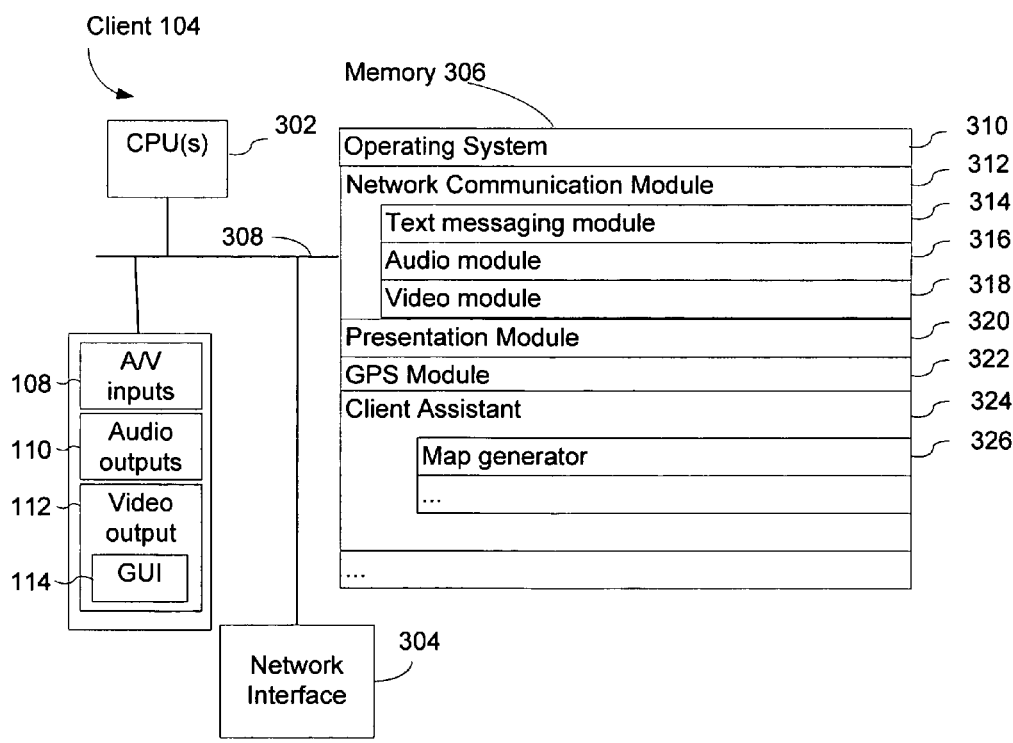

FIGS. 3A and 3B are block diagrams illustrating two exemplary clients 104. As noted above, client 104 typically includes audio/video inputs 108 (e.g., a microphone and a video camera), audio output 110 (e.g., speakers or headphones), and video output 112 (e.g., a display). Video output 112 displays graphical user interface (GUI) 114. Client 104 typically includes one or more processing units (CPUs) 302, one or more network or other communications interfaces 304, memory 306, and one or more communication buses 308 for interconnecting these components. Memory 306 may include high-speed random access memory and may also include non-volatile memory, such as one or more magnetic or optical storage disks. Memory 306 may store the following programs, modules and data structures, or a subset or superset thereof:

Operating System 310 that includes procedures for handling various basic system services and for performing hardware dependent tasks;
Network Communication Module (or instructions) 312 that is used for connecting client 104 to other computers (e.g., server 102 and other clients 104) via the one or more communications Network Interfaces 304 (wired or wireless) and one or more communication networks 106 (FIG. 1), such as the Internet, other wide area networks, local area networks, metropolitan area networks, and so on;
Presentation Module 320, for formatting the maps, meeting spots, and other data (e.g., user icons and text chat) for display in GUI 114;
Global Positioning System (GPS) Module (or instructions) 322 for determining the location of client 104; and
Client Assistant 324, which handles data formatting and/or management tasks, at least some of which could also be handled by Mapping Engine 220.

Network Communication Module 312 may include the following programs, modules and data structures, or a subset or superset thereof:

Text messaging module 314 that supports text messaging (e.g., instant messaging) between clients 104;
Audio module 316 that supports audio communications (e.g., voice chat or VoIP) between clients 104; and
Video module 318 that supports video communications (e.g., video chat) between clients 104.

As illustrated schematically in FIG. 3B, client 104 can incorporate modules, applications, and instructions for performing a variety of mapping related processing tasks (e.g., map generator 326), at least some of which could be handled by Mapping Engine 220 in server 102 instead. Alternatively, in some embodiments, client 104 can contain less functionality than shown in FIG. 3A. For example, in some embodiments, client 104 need not have a GPS Module 322.

Figure 4:
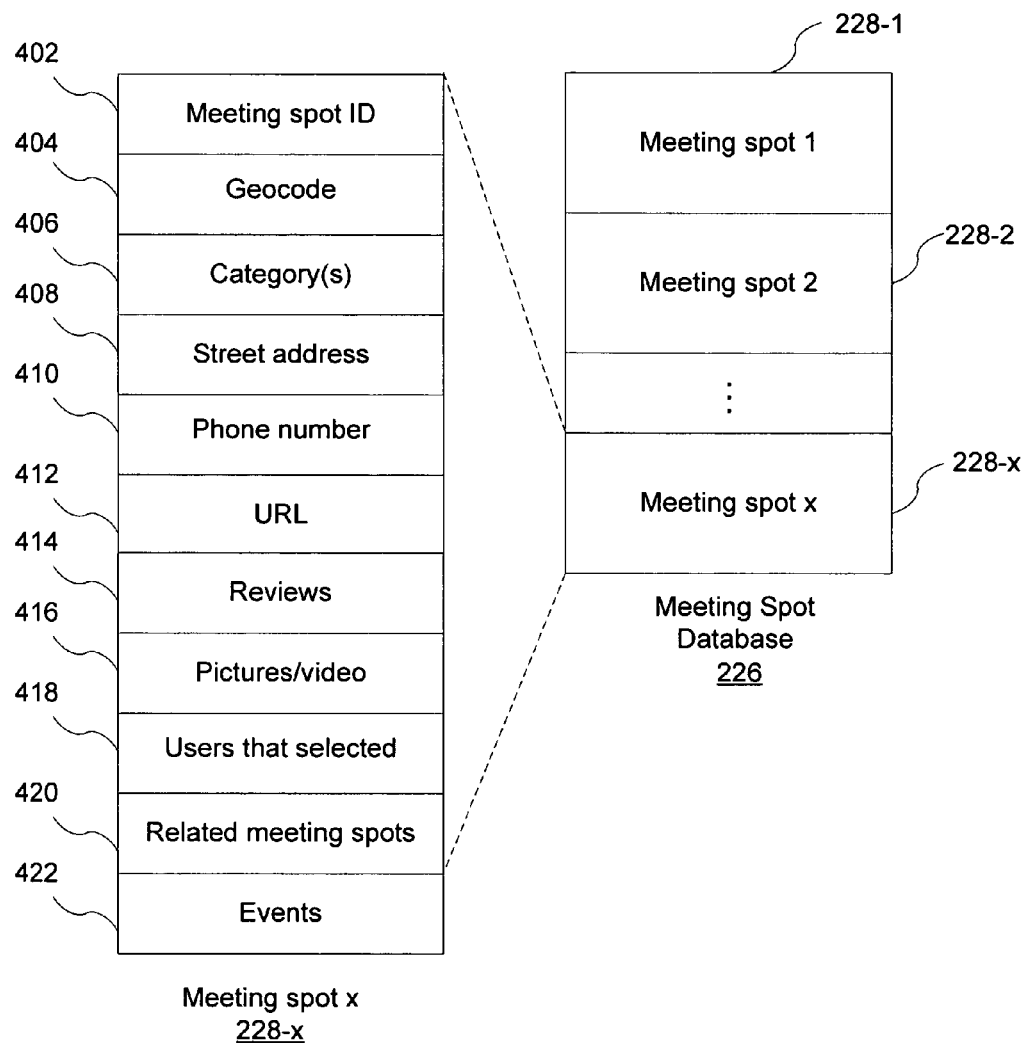
FIG. 4 is a block diagram illustrating an exemplary meeting spot database and an exemplary meeting spot record in accordance with one embodiment of the invention.

FIG. 4 is a block diagram illustrating an exemplary meeting spot database 226 and an exemplary meeting spot record 228 in accordance with one embodiment of the invention. Meeting Spot Database 226 stores meeting spot records 228, for example meeting spot 1 (228-1) through meeting spot x (228-x), where x may represent the number of meeting spots.

A meeting spot record (e.g., meeting spot x 228-x) may include the following data, or a subset or superset thereof:

Meeting spot ID 402 that uniquely identifies a particular meeting spot (e.g., an n-bit binary number);
Geocode 404 that corresponds to the location of the meeting spot;
Category(s) 406 that classify the meeting spot (e.g., dining, exercising, partying, playing, shopping, or watching);
Street address 408 for the meeting spot;
Phone number 410 for the meeting spot;
URL 412 for a web page or site associated with the meeting spot;
Reviews 414 of the meeting spot by users and/or professional reviewers, or the URL or a link to a web page or site that hosts such reviews);
Pictures/videos 416 of the meeting spot, or the URL or a link to a web page or site that hosts such reviews;
Users IDs of users that have selected the meeting spot 418;
Meeting spot IDs of other meeting spots 420 that are related to the meeting spot associated with meeting spot ID 402 (e.g., other nearby meeting spots); and
Events 422 that includes dates and times for events occurring at the meeting spot.

In some embodiments, events 422 permit a temporal component to be added to meeting spots. In some embodiments, a user can tag, enter, or otherwise select particular past, present, or future events at meeting spots. Thus, a meeting-spot-based user interest profile 508 can also include particular events at meeting spots that the user has selected. User-selected events can change the similarity scores between the computer user and other computer users and, correspondingly, the display of information concerning the other computer users. For example, information about other users 932 that have selected some of the same events as the user may be displayed more prominently (e.g., at higher display positions in a list 960).

Figure 5:
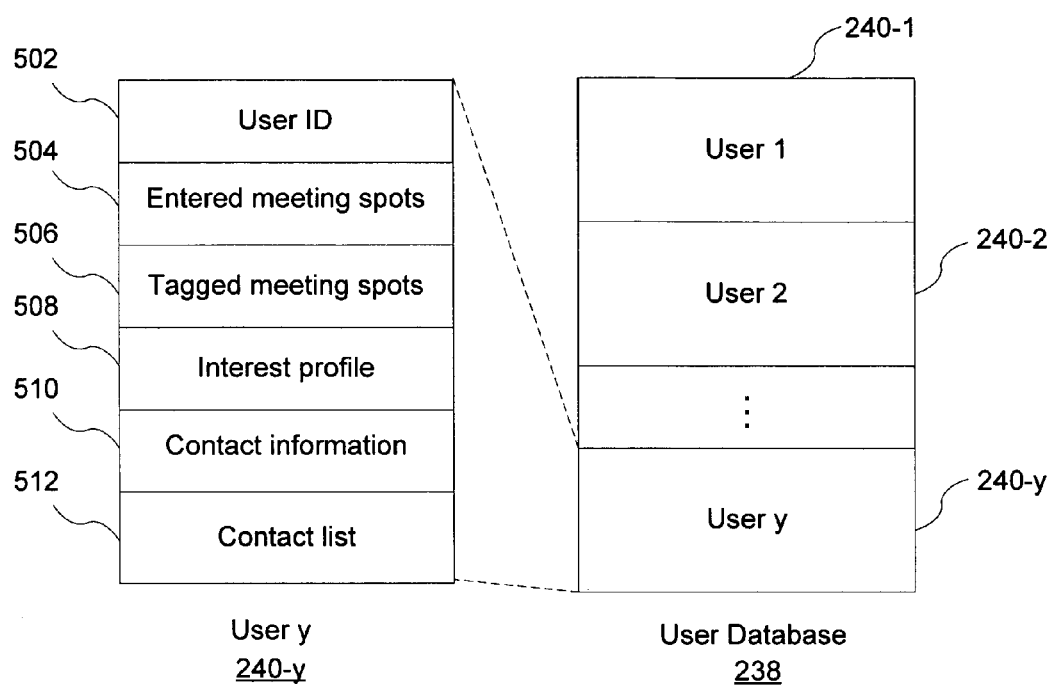
FIG. 5 is a block diagram illustrating an exemplary user database and an exemplary record for a particular user in accordance with one embodiment of the invention.

FIG. 5 is a block diagram illustrating an exemplary user database 238 and an exemplary record 240-y for a particular user in accordance with one embodiment of the invention. User Database 238 stores user records 240, for example User 1 (240-1) through User y (240-y), where y may represent the number of users.

A user record 240 (e.g., record 240-y for User y) may include the following data, or a subset or superset thereof:

User ID 502 that uniquely identifies a particular user (e.g., an n-bit binary number);
Entered meeting spots 504, e.g., meeting spot IDs that correspond to meeting spots that the user has chosen to enter;

Tagged meeting spots 506, e.g., meeting spot IDs that correspond to meeting spots that the user has chosen to tag (e.g., to tag as a favorite meeting spot);

Interest profile 508 for the user that is based at least in part on the meeting spots selected by the user (e.g., by entering and/or tagging);

Contact information 510 for the user (e.g., online communications address(es), and/or phone number(s) for the user); alternately, this field 510 of the user record may contain a link to the user's contact information; and Contact list 512 for the user that contains the contact information of other users known to the user; alternately, this field 512 of the user record may contain a link to the user's contact list.

As used herein, "entered meeting spots" are meeting spots in a GUI that a user has presently selected. For example, the user may be exploring meeting spots that the user has not visited before (e.g., to see which other users have also currently selected the corresponding meeting spot in their GUI). As used herein, "tagged meeting spots" are meeting spots in a GUI that the user has tagged or otherwise labeled, independent of whether the user has currently selected (entered) the tagged meeting spot. By analogy to web browsing, a user may have currently selected several web pages for viewing (e.g., via tabbed browsing or multiple windows) and some of those web pages may have been bookmarked by the user. In this analogy, entered meeting spots are analogous to currently selected web pages and tagged meeting spots are analogous to bookmarked web pages. Both entered meeting spots and tagged meeting spots can be used to determine a user's interest profile. In some embodiments, a user' interest profile is updated in real time as the user enters and leaves meeting spots and/or as the user tags and untags meeting spots.

Figure 6:
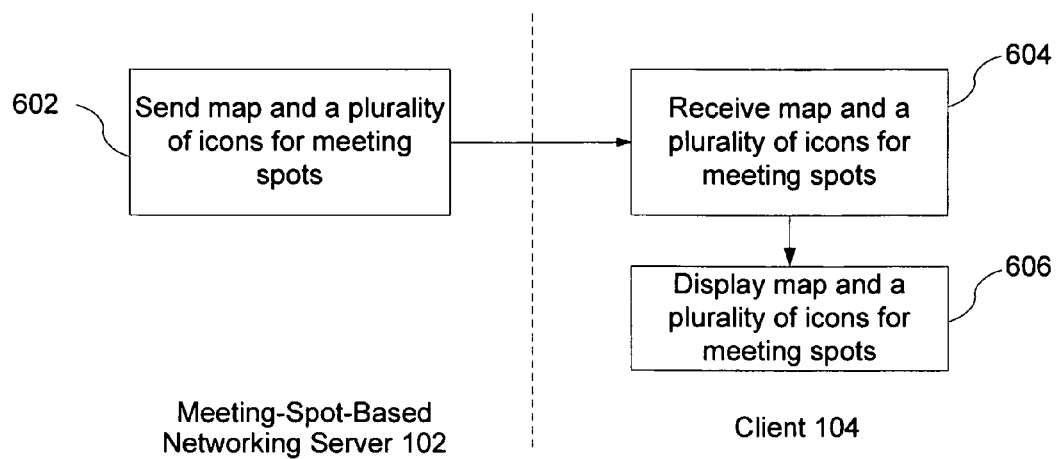
FIG. 6 is a flowchart representing a method of using maps of meeting spots to facilitate or initiate online communications in accordance with one embodiment of the present invention.

FIG. 6 is a flowchart representing a method of using maps of meeting spots to facilitate or initiate online communications in accordance with one embodiment of the present invention. FIG. 6 shows processes performed by server 102 and client 104. It will be appreciated by those of ordinary skill in the art that one or more of the acts described may be performed by hardware, software, or a combination thereof, as may be embodied in one or more computing systems. In some embodiments, portions of the processes performed by server 102 can be performed by client 104 using components analogous to those shown for server 102 in FIG. 2.

Server 102 sends (602) a map to client 104 along with a plurality of icons for meeting spots that are to be overlaid on the map when displayed at the client. In some embodiments, the map and icons are sent using a single data structure, while in other embodiments the map and the icons are sent using distinct data structures—in which case the map and icon images are merged during the display process. In some embodiments, the map and the plurality of meeting spot icons are generated by mapping engine 220 using data in mapping database 224 and meeting spot database 226.

Client 104 receives (604) the map and the plurality of icons for meeting spots.

Client 104 displays (606) the map and the plurality of icons for meeting spots overlaid on the map in a GUI. In some embodiments, presentation module 320 (FIG. 3A) formats the received map and meeting spot icon data for display.

Figure 7:
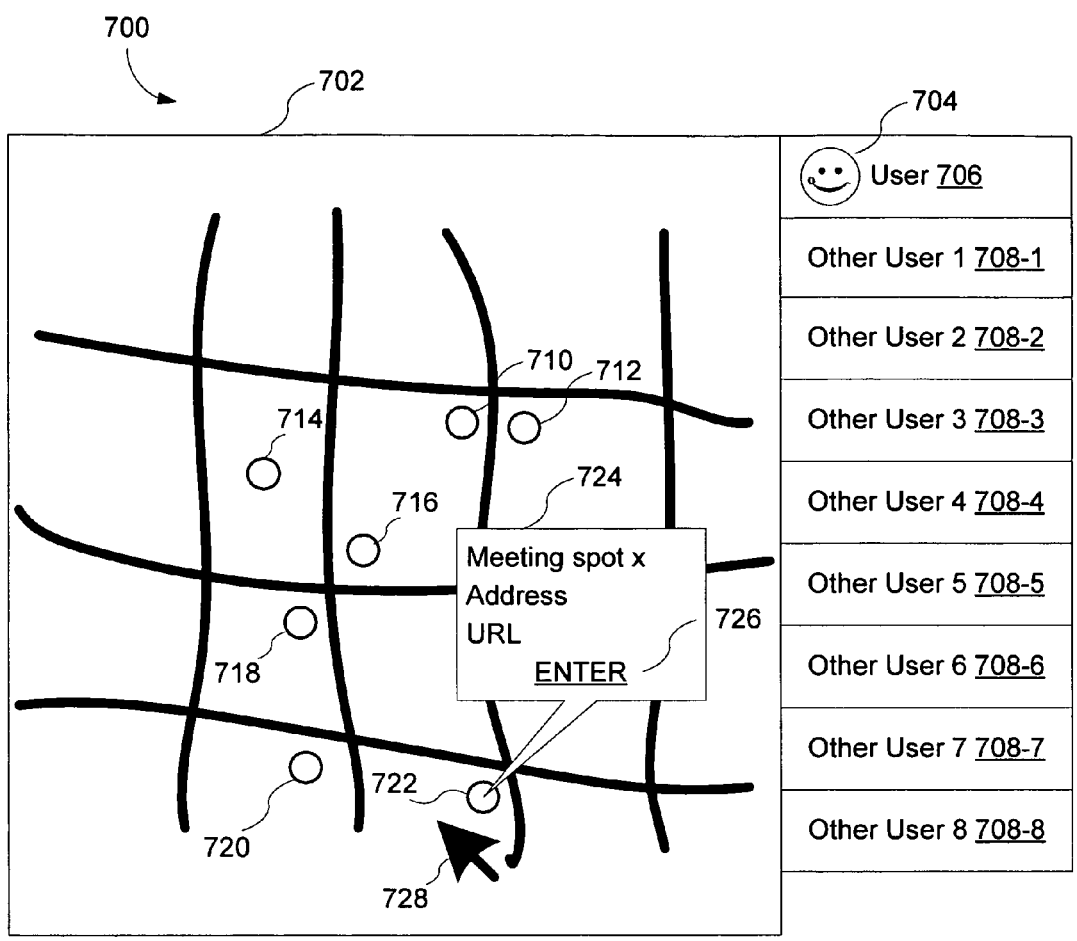
FIG. 7 is a schematic screen shot of an exemplary graphical user interface of a map with user-selectable meeting spots in accordance with one embodiment of the present invention.

FIG. 7 is a schematic screen shot of an exemplary graphical user interface of a map with user-selectable meeting spots in accordance with one embodiment of the present invention. In some embodiments, GUI 700 includes map 702, meeting spots 710-722, and icons 708 (i.e., visual elements in the GUI) with information about other users 708. In some embodiments, GUI 700 includes an icon 706 with user information (e.g., the user's screen name for online communications, and optionally an icon 704 representing the user). The information about other users contained in icons 708 may include, without limitation, the screen names for the other users and icons (e.g., thumbnails images or other icons analogous to the user's icon 704) that represent the other users in online communications.

In some embodiments, selection of a meeting spot icon (e.g., icon 710) by a user at client device 104 initiates the display of information about other users (e.g., other user icons 708 in FIG. 7) that have also selected the same meeting spot icon, thereby facilitating online communications with one or more of the other users. In some embodiments, selection of a meeting spot icon is done by the user clicking cursor 728 on the icon. In some embodiments, selection of a meeting spot icon is done by the user hovering the cursor 728 over the icon, which results in the display of more information 724 about the meeting spot and a link (e.g., ENTER link 726) that the user can activate to select the corresponding meeting spot.

In some embodiments, the meeting spot icon is selected by the user clicking on a predefined region that includes the meeting spot (e.g., clicking down and then up on a button while cursor 728 is over the meeting spot icon, or just clicking down on the button, or just clicking up on the button), placing (or hovering) cursor 728 over or near the meeting spot icon for a predetermined period of time (e.g., a mouse-hover), or other activity indicating that the user expects to activate a feature associated with the meeting spot icon. One of ordinary skill in the art would recognize various ways to identify a user-initiated activity as described above such as by recognizing a click-down event and/or click-up event, or monitoring the movement of the cursor over a period of time. This could be done, for example, by the client assistant 324 or operating system 310.

In some embodiments, selection of a meeting spot icon (e.g., icon 710) by a user at client device 104 initiates online communications (e.g., a text, audio, or video chat) with one or more other users that have also selected "the same meeting spot icon" (e.g., by selecting a corresponding meeting spot icon in a GUI on their respective client devices 104).

Figure 8A:
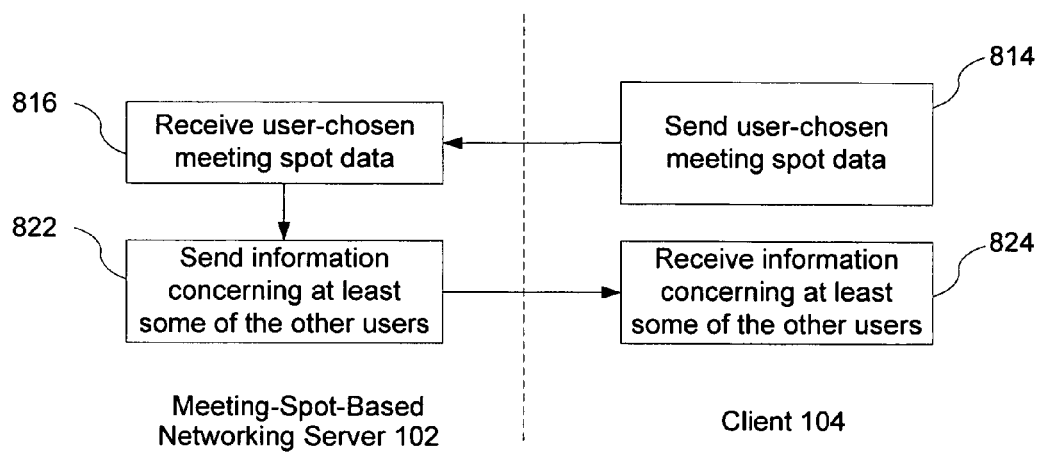
FIGS. 8A and 8B are flowcharts representing methods of using meeting spots selected by a computer user to facilitate online communications with other computer users in accordance with embodiments of the present invention.
Figure 8B:
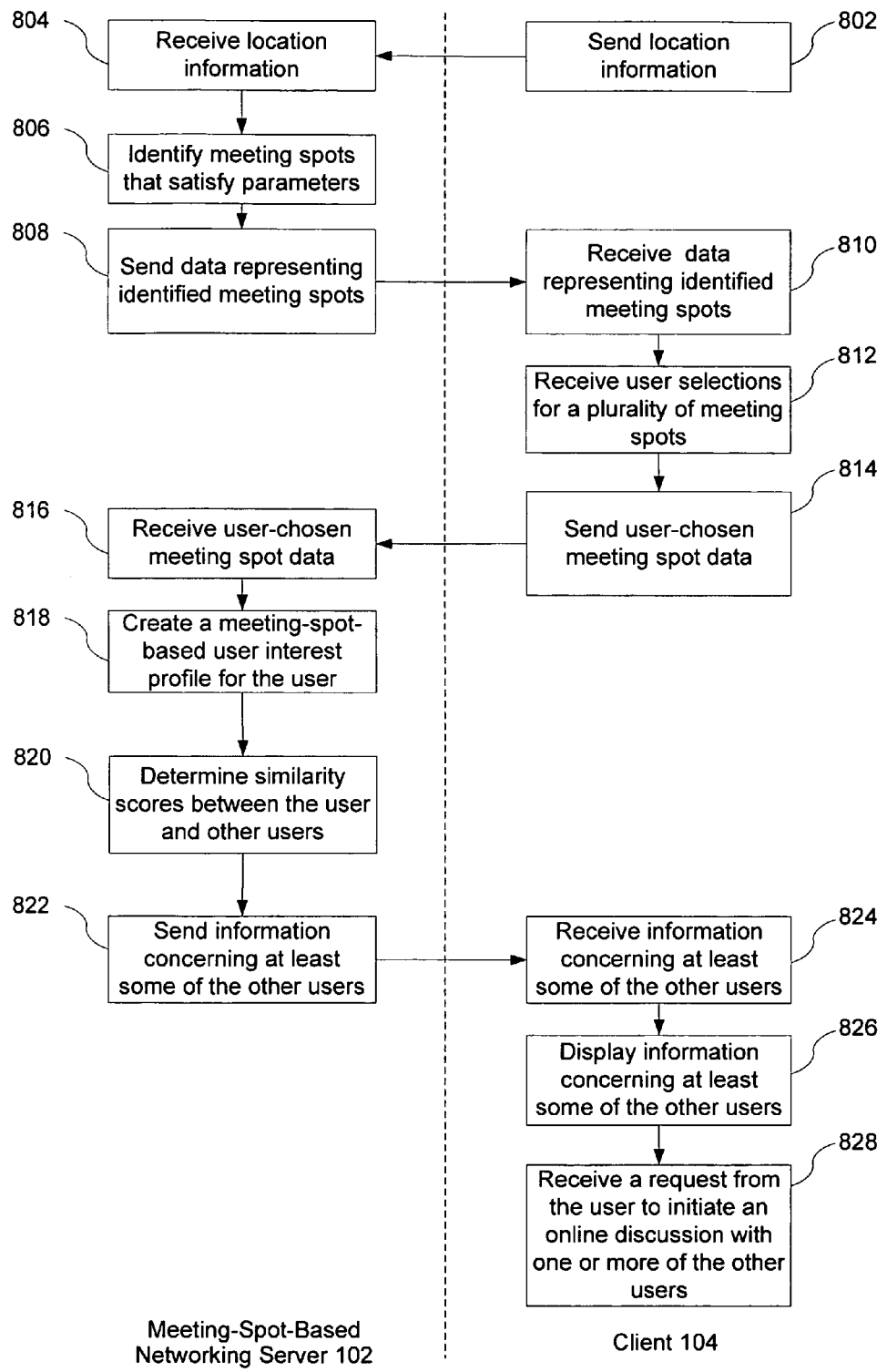

FIGS. 8A and 8B are flowcharts representing methods, performed by server 102 and client 104, of using meeting spots selected by a computer user to facilitate online communications with other computer users in accordance with embodiments of the present invention. It will be appreciated by those of ordinary skill in the art that one or more of the acts described may be performed by hardware, software, or a combination thereof, as may be embodied in one or more computing systems. In some embodiments, portions of the processes described here as being performed by server 102 can be performed instead by client 104. FIGS. 8A and 8B are further described below.

Figure 9:
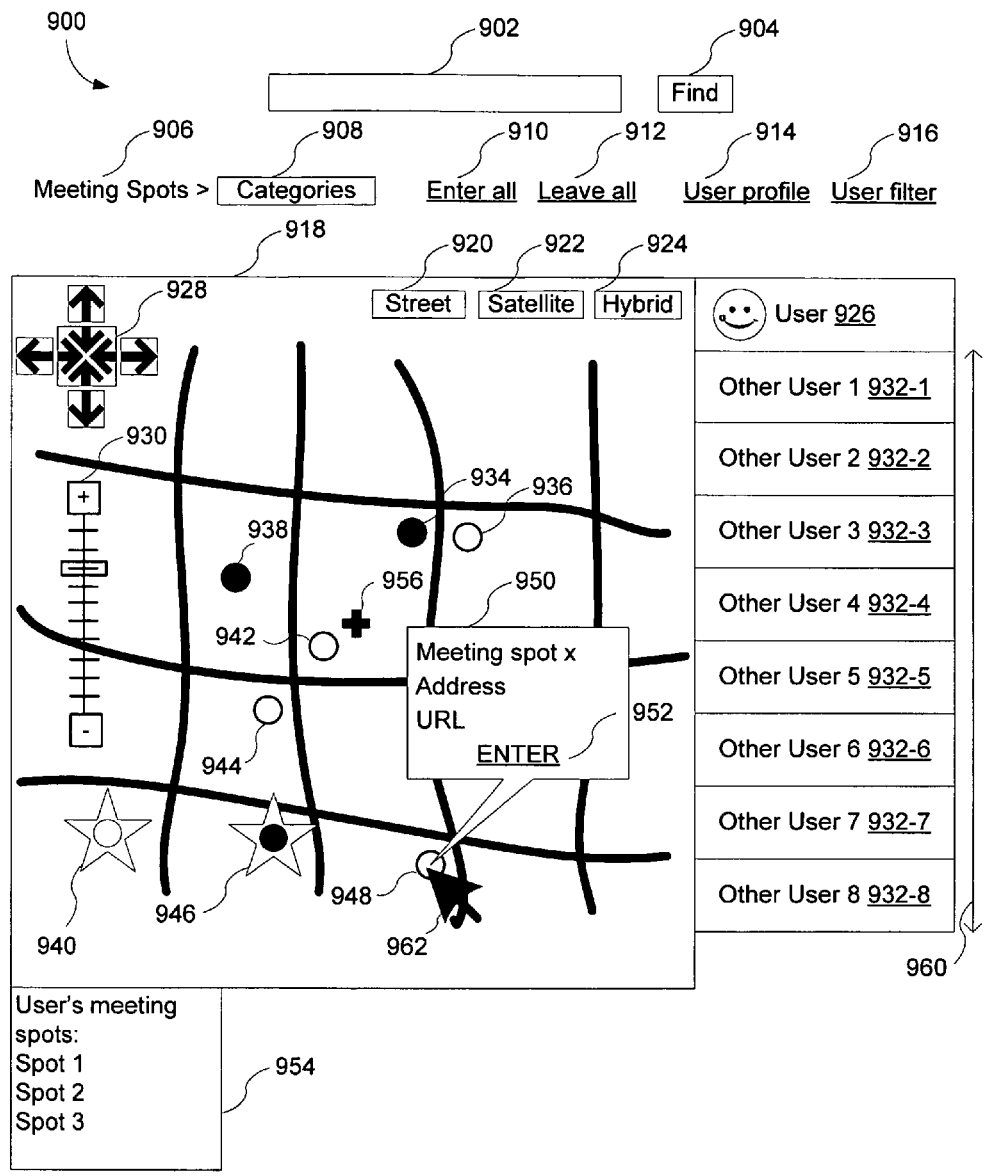
FIG. 9 is a schematic screen shot of an exemplary graphical user interface of a map with user-selectable meeting spots in accordance with one embodiment of the present invention.

FIG. 9 is a schematic screen shot of an exemplary graphical user interface 900 of a map with user-selectable meeting spots in accordance with one embodiment of the present invention. In some embodiments, GUI 900 includes the following elements, or a subset or superset thereof:

Search input box 902 for entering location information or other search query keywords;

Search initiation icon 904;

Meeting spots classifier icon 906 that, when clicked, allows a user to remove a selected category filter 908 so that more meeting spot icons are displayed;

Meeting spots categories filter 908 that lets a user choose the types of meeting spots displayed;

"Enter all" link 910 that lets a user select all of the meeting spots on the map 918;

"Leave all" link 912 that lets a user deselect all of the meeting spots in the map 918;

User profile link 914 that lets a user see and edit his or her profile 508;

User filter 916 that lets a user filter other users with whom interaction is desired (e.g., interact only with other users in the user's contact list 512; interact with anybody, including strangers; or interact with other users whose profiles satisfy one or more criteria (e.g., age range, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat"));

Map 918, which shows a drawing, diagram, and/or picture (e.g., a satellite photograph) of a geographic area;

Street view icon 920 for choosing a street view in map 918;

Satellite view icon 922 for choosing a satellite view in map 918;

Hybrid view icon 924 for choosing a hybrid view of both street names and satellite images in map 918;

User icon 926 that displays information about the user (e.g., a thumbnail image or other icon that represents the user in online communications);

Pan controls 928 that move the area shown on map 918;

Zoom control 930 that changes the scale/magnification of map 918;

Icons 932 that display information (e.g., screen names and/or thumbnail images) about other users that have also selected two or more of the meeting spots selected by the computer user. (In some embodiments, the icons for other users are displayed in a list 960. In some embodiments, icons 932 display information about other users that have also selected one or more of the meeting spots selected by the computer user.);

Meeting spot icons 934-948, which may have different types of status indicators, such as: clear icons (936, 942, 944, and 948) for meeting spots that the user has not entered or selected; dark icons (934, 938, 946) for meeting spots that the user has entered or selected; and starred icons (940, 946) for meeting spots that the user has tagged as favorites. (Alternatively, different colors can be used to represent different status, such as green icons for entered meeting spots and red icons for not entered meetings spots.);

Box 950 that displays additional information about a meeting spot (e.g., when cursor 962 hovers over or clicks on a meeting spot icon (e.g., 948)) and/or permits additional user actions with respect to the meeting spot, such as entering or selecting the meeting spot by selecting link 952;

Location icon 956 that marks the location specified by the user in search box 902; and List of user's meeting spots 954 that can be a list of meeting spots that the user has currently entered, a list of meeting spots tagged by the user, a list of meeting spots that the user has currently or recently visited in the physical world (e.g., as determined by GPS tracking of the user's cell phone or other client 104).

As noted above, in some embodiments, the graphical user interface 900 may contain a subset of the features or items shown in FIG. 9. Furthermore, in some embodiments, the graphical user interface 900 may include other features or items not shown in FIG. 9.

Referring to FIGS. 8A and 8B, client 104 sends (802) location information to server 102. In some embodiments, the location information is specified by a user inputting the location information into client 104 (e.g., by the user inputting the location information into search box 902 and activating search initiation icon 904). The location information may concern the current location of the user, a potential future location of the user, or any other location chosen by the user. In some embodiments, the location information is all or part of a mailing address. In some embodiments, the location information is a zip code. In some embodiments, the location information is the position of client 104, e.g., as determined by the client 104 using GPS module 322. In yet other embodiments, the client 104 sends an IP address of the client to the server 104, which associates location information with the client's IP address. In many cases, the IP address of the client is sufficient to identify the city or zip code of the client 104, and in some cases the IP address of the client may be sufficient to identify a specific building or set of buildings (e.g., a corporate or school campus). In some embodiments, for safety and privacy, no information about the location of client 104 is sent to the server 102 without the knowledge and/or permission of the user. In such embodiments, the user can prevent the server 102 (and other users) from knowing the user's physical location.

Server 102 receives (804) the location information sent by client 104.

Server 102 identifies (806) meeting spots that satisfy one or more parameters. In some embodiments, the one or more parameters include a physical distance, or an estimated driving time relative to the location specified by the location information. In some embodiments, the one or more parameters include a type of meeting spot, such as a dining location, an exercising location, a partying location, a playing location, a shopping location, or a watching location. In some embodiments, the one or more parameters include a type of meeting spot and either a physical distance or an estimated driving time relative to the location specified by the location information. In some embodiments, the one or more parameters are keywords in a search query. In some embodiments, at least some of the parameters are selected by the user at client 104. For example, the user may select the type of meeting spot using category filter 908.

Server 102 sends (808) and client 104 receives (810) data representing the identified meeting spots. In some embodiments, the identified meeting spots are displayed in a map in a GUI (e.g., meeting spots 934-948 in map 918 in GUI 900). In some embodiments, the icons 934-948 representing meeting spots are within a predetermined distance or estimated driving time from a location on the map specified by the computer user. In some embodiments, the map is a street map, a satellite photograph, or a hybrid map showing street names superimposed on a satellite photograph.

Client 104 receives (812) user selections for a plurality of meeting spots. In some embodiments, the user selects the plurality of meeting spots using a map-based GUI (e.g., 900). In some embodiments, selection of a meeting spot icon is accomplished by the user clicking cursor 960 on the icon. In some embodiments, selection of a meeting spot icon is accomplished by the user hovering cursor 960 over the icon, which results in the display of more information 950 about the meeting spot and a link (e.g., ENTER link 952) that the user can activate to select the corresponding meeting spot.

Client 104 sends (814) and server 102 receives (816) user-chosen meeting spot data that correspond to the plurality of meeting spots selected by the user.

In some embodiments, server 102 creates (818) a meeting-spot-based user interest profile for the user based at least in part on the plurality of meeting spots selected by the user. In some embodiments, the meeting-spot-based user interest profile for the user is created in real-time, i.e., the profile is generated and updated as the user selects meeting spots. In some embodiments, the meeting-spot-based user interest profile for the user is stored, e.g., in interest profile 508 in user record 246. In some embodiments, interest profile 508 is a list of meeting spots selected by the user. In some embodiment, interest profile 508 is a list of meeting spots selected by the user and one or more attributes concerning the user (e.g., age, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat")).

In some embodiments, server 102 determines (820) similarity scores between the user and other users that have also selected two or more of the meeting spots selected by the user, wherein the similarity scores are based at least in part on the overlap in meeting-spot-based user interest profiles for the user and for the other users. In some embodiments, server 102 determines similarity scores between the user and other users that have also selected one or more of the meeting spots selected by the user. In some embodiments, the similarity score is the number of overlapping meeting spots that both users have presently entered. In some embodiments, the similarity score is the number of overlapping meeting spots that both users have presently entered divided by the total number of meeting spots that both users have presently entered. In some embodiments, the similarity score is the number of overlapping meeting spots that both users have tagged. In some embodiments, the similarity score is the number of overlapping meeting spots that both users have tagged divided by the total number of meeting spots that both users have tagged. In some embodiments, the similarity score is a combination of one of the preceding scores with a score based on the overlap in attributes of the user and the other user (e.g., age, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat").

Server 102 sends (822) and client 102 receives (824) and displays (826) information (e.g., icons 932) concerning at least some of the other users for display. In some embodiments, the display of the information 932 concerning the other users depends at least in part on the similarity scores between the user and the other users. In some embodiments, users with higher similarity scores are displayed higher (i.e., at higher display positions) than users with lower similarity scores in a list 960 of other users. In some embodiments, the similarity scores of the other users and the order in which the other users 932 are displayed in list 960 changes in real time as the user changes the meeting spots that he or she has selected (e.g., by entering or leaving meetings spots). In some embodiments, GUI icons associated with users with higher similarity scores are displayed more prominently than GUI icons associated with users with lower similarity scores. In some embodiments, GUI icons differentiate users based at least in part on the users' similarity scores.

In some embodiments, the information about other users is filtered (e.g., via user filter 916) so that only information about other users with whom interaction is desired is displayed (e.g., interact only with other users in the user's contact list 512; interact with anybody, including strangers; or interact with other users whose profiles satisfy one or more criteria (e.g., age range, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat")). In such embodiments, the "in bound" information about other users is filtered.

Conversely, in some embodiments, a user can filter the "out bound" information concerning the user (e.g., via a filter analogous to user filter 916), thereby enabling the user to control: (1) which other users are permitted to view the user's information (e.g., show the user's information only to other users in the user's contact list 512; show the user's information to anybody, including strangers; or show the user's information to other users whose profiles satisfy one or more criteria) and (2) what information about the user is communicated (e.g., the user's screen name or other contact information 510, a thumbnail image, and/or one or more user attributes in user profile 508).

In some embodiments, a user can filter or control both the "out bound" information concerning the user and the "in bound" information concerning other users.

In some embodiments, client 104 receives (828) a request from the user to initiate an online discussion or communication with one of the other users. In some embodiments, selecting an icon 932 representing another computer user initiates an online communication with the computer user represented by the selected icon 932. In some embodiments, the online communication includes instant messaging, voice communications (e.g., using VoIP), and/or video chat. In some embodiments, the user may request to initiate online communications with two or more of the other users, in effect requesting the formation of a multi-user chat room or multi-user communication.

Figure 10:
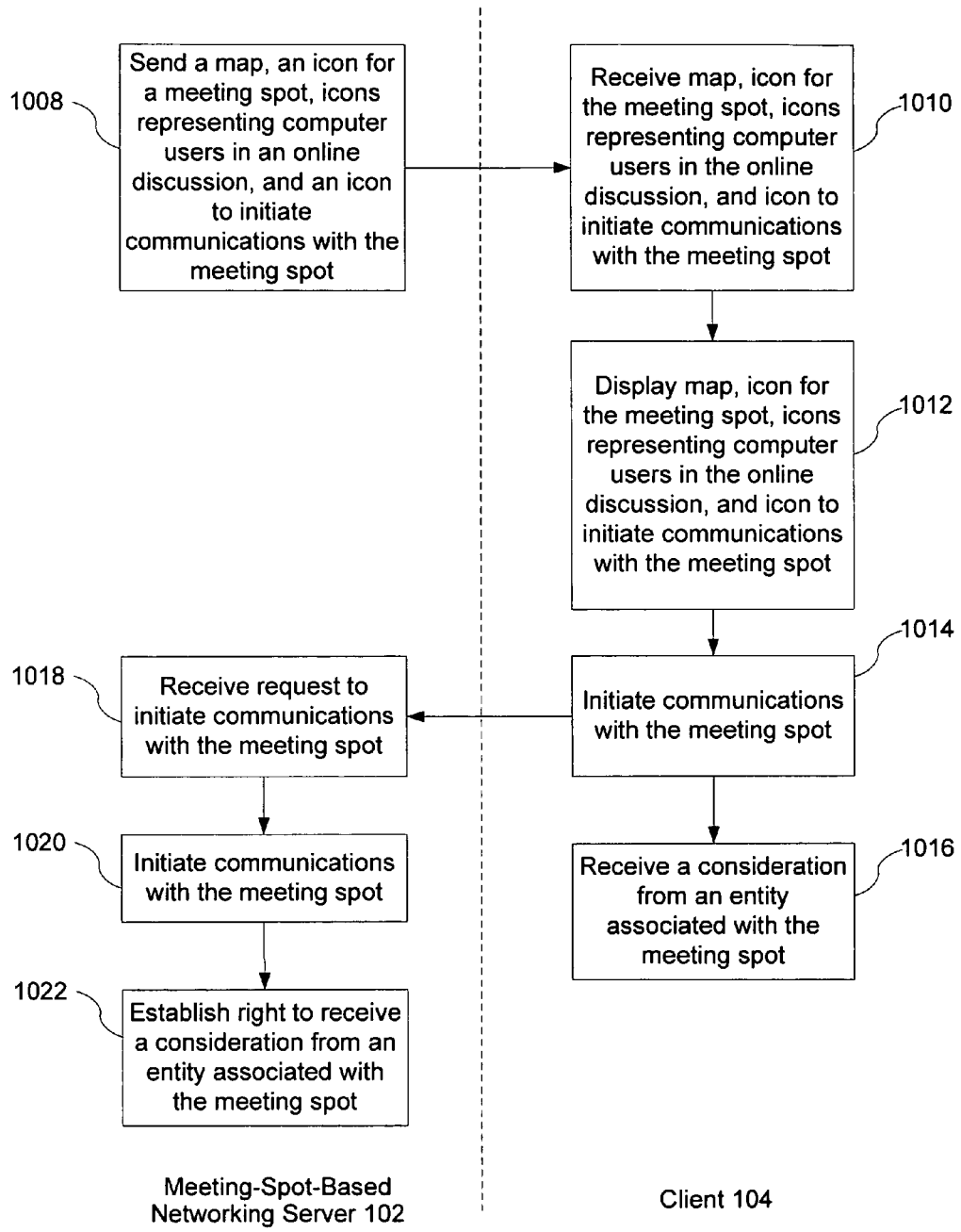
FIG. 10 is a flowchart representing a method of identifying meeting spots and communicating with meeting spots in accordance with one embodiment of the present invention.
Figure 11:
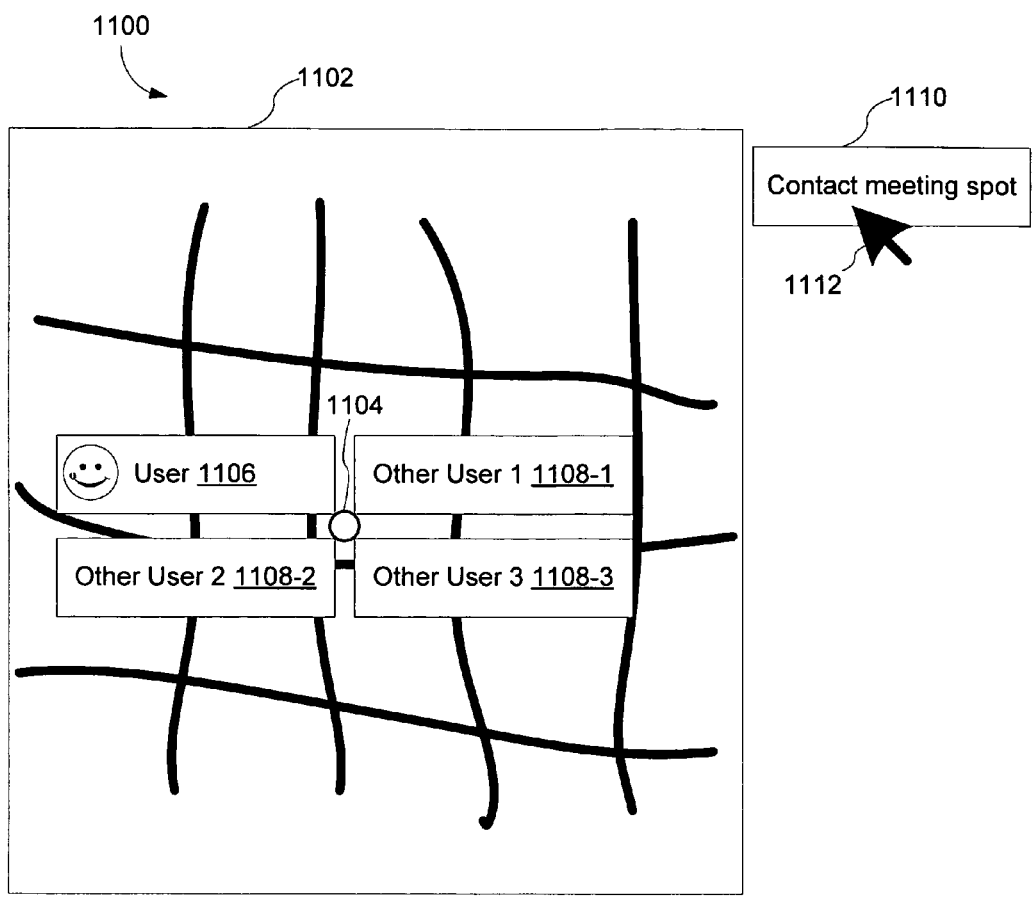
FIG. 11 is a schematic screen shot of an exemplary graphical user interface of a map with user-selectable meeting spots in accordance with one embodiment of the present invention.

FIG. 10 is a flowchart representing a method of identifying meeting spots and communicating with meeting spots in accordance with one embodiment of the present invention. FIG. 10 shows processes performed by server 102 and client 104. It will be appreciated by those of ordinary skill in the art that one or more of the acts described may be performed by hardware, software, or a combination thereof, as may be embodied in one or more computing systems. In some embodiments, portions of the processes described here as being performed by server 102 can be performed instead by client 104. FIG. 11 is a schematic screen shot of an exemplary graphical user interface of a map with user-selectable meeting spots in accordance with one embodiment of the present invention.

Server 102 sends (1008) to a plurality of client devices associated with computer users in an online discussion information corresponding to: a map 1102, an icon for a meeting spot to be overlaid on the map 1104, a plurality of icons representing at least some of the computer users in the online discussion (e.g., 1106, 1108-1, 1108-2, and 1108-3), and an icon 1110 to initiate online communications between a respective client device and a computer associated with the meeting spot. In some embodiments, the icon for the meeting spot 1104 is also the icon to initiate online communications 1110. The information corresponding to map 1102 and the various icons may be sent using a single data structure or multiple data structures that are merged for display at the client 104. In some embodiments, the information sent that corresponds to map 1102 and the various icons contains all of the data needed to display the map 1102 and the various icons in GUI 1100 on client 104. In some embodiments, the information sent that corresponds to map 1102 and/or the various icons include pointers to data stored in client 104. The pointers in combination with the data stored in client 104 can be used to display the map 1102 and the various icons in GUI 1100 on client 104.

Client 104 receives (1010) and displays (1012) the map 1102, the icon for the meeting spot 1104, the plurality of icons representing computer users (e.g., 1106, 1108-1, 1108-2, and 1108-3), and the icon 1110 to initiate online communications with the meeting spot. In some embodiments, the map 1102, the icon for the meeting spot 1104, the plurality of icons representing computer users (e.g., 1106, 1108-1, 1108-2, and 1108-3), and the icon 1110 to initiate online communications with the meeting spot are displayed in a single application window (e.g., a browser window). In some embodiments, the plurality of icons representing computer users (e.g., 1106, 1108-1, 1108-2, and 1108-3) are fully or partially overlaid on the map 1102.

Client 104 initiates (1014) online communications with the computer associated with the meeting spot in response to the computer user selecting a corresponding icon (e.g., by the user clicking on icon 1110 with cursor 1112).

In some embodiments, client 104 receives (1016) a consideration from an entity associated with the meeting spot. In some embodiments, the consideration is a discount coupon, credit coupon, or membership card. In some embodiments, the entity associated with the meeting spot is the computer associated with the meeting spot.

In some embodiments, server 102 receives (1018) a request to initiate online communications between the computer associated with the meeting spot and at least one client 104 in the online discussion.

In some embodiments, server 102 initiates (1020) online communications between the computer associated with the meeting spot and at least one client 104 in the online discussion.

In some embodiments, server 102 establishes (1022) a right to receive a consideration from an entity associated with the meeting spot. In some embodiments, the consideration is a referral fee or a commission. Establishing a right to receive consideration may be accomplished, for example, by posting an entry to an account that will reconciled or otherwise processed at a later time. In some embodiments, the entity associated with the meeting spot is the computer associated with the meeting spot. In some embodiments, the server 102 receives the aforementioned consideration (i.e., participates in a funds transfer, in real time) instead of establishing a right to receive that consideration at 1022.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
at a server computer,
receiving meeting spot data that correspond to a plurality of meeting spots selected by a user at a client device;
creating a meeting-spot-based user interest profile for the user based at least in part on the plurality of meeting spots selected by the user;
determining a first similarity score between the user and a first other user that has also currently selected two or more of the meeting spots selected by the user, wherein the first similarity score is based at least in part on a first overlap in meeting-spot-based user interest profiles for the user and the first other user, wherein the first overlap includes the current selection of the two or more meeting spots by both the user and the first other user;
determining a second similarity score between the user and a second other user that has also currently selected two or more of the meeting spots selected by the user, wherein the second similarity score is based at least in part on a second overlap in meeting-spot-based user interest profiles for the user and the second other user, wherein the second overlap includes the current selection of the two or more meeting spots by both the user and the second other user; and
sending information concerning at least one of the first other user and the second other user to the client device for display, wherein display of information concerning a respective other user depends at least in part on a respective similarity score between the user and the respective other user.

2. The method of claim 1, wherein the meeting-spot-based user interest profile for the user includes one or more of: meeting spots selected by the user, and one or more events at the plurality of the meeting spots selected by the user.

3. A computer-implemented method, comprising: at a server computer,
receiving meeting spot data that correspond to a plurality of meeting spots selected by a computer user, who is currently online and active, at a client device;
sending information concerning other computer users, who are currently online and active, to the client device for display, wherein each of the other computer users has also currently selected two or more of the meeting spots selected by the computer user;
creating a meeting-spot-based user interest profile for the computer user based at least in part on the plurality of meeting spots selected by the computer user; and
determining a first similarity score between the computer user and a first other computer user that has also currently selected two or more of the meeting spots selected by the computer user,
wherein the first similarity score is based at least in part on a first overlap in meeting-spot-based user interest profiles for the computer user and the first other computer user, wherein the first overlap includes the current selection of the two or more meeting spots by both the user and the first other user; and
determining a second similarity score between the computer user and a second other computer user that has also currently selected two or more of the meeting spots selected by the computer user,
wherein the second similarity score is based at least in part on a second overlap in meeting-spot-based user interest profiles for the computer user and the second other computer user, wherein the second overlap includes the current selection of the two or more meeting spots by both the computer user and the second other user.

4. The computer-implemented method of claim 3, wherein display of information concerning a respective other computer user depends at least in part on a respective similarity score between the computer user and the respective other computer user.

5. The computer-implemented method of claim 4, wherein computer users with higher similarity scores are displayed at higher display positions than computer users with lower similarity scores in a list of other computer users.

6. A graphical user interface on a computer comprising:
a plurality of icons representing meeting spots selected by a computer user, who is currently online and active, overlaid on a graphically displayed geographic map; and
a plurality of icons representing other computer users who are currently online and active, wherein each of the other computer users has also currently selected two or more of the meeting spots selected by the computer user;
wherein the display of a respective icon representing a respective other computer user in the plurality of icons representing other computer users depends in part on a respective similarity score between the computer user and the respective other computer user, wherein the respective similarity score is based at least in part on an overlap in meeting-spot-based user interest profiles for the computer user and the respective other computer user, wherein the overlap includes the current selection of the two or more meeting spots by both the computer user and the respective other user.

* * * * *